United States Patent
Dreves et al.

(10) Patent No.: US 9,903,244 B2
(45) Date of Patent: Feb. 27, 2018

(54) COMPACT EXHAUST GAS TREATMENT SYSTEM AND METHOD OF OPERATING THE SAME

(71) Applicant: Caterpillar Motoren GmbH & Co. KG, Kiel (DE)

(72) Inventors: Jan Dreves, Kiel (DE); Carsten Rickert, Kiel (DE); Thomas Obenaus, Fernitz (AT)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 304 days.

(21) Appl. No.: 14/414,752

(22) PCT Filed: Jun. 25, 2013

(86) PCT No.: PCT/EP2013/001866
§ 371 (c)(1),
(2) Date: Jan. 14, 2015

(87) PCT Pub. No.: WO2014/012617
PCT Pub. Date: Jan. 23, 2014

(65) Prior Publication Data
US 2015/0176454 A1    Jun. 25, 2015

(30) Foreign Application Priority Data
Jul. 18, 2012   (EP) .................................. 12176940

(51) Int. Cl.
*F01N 3/20* (2006.01)
*F02B 37/013* (2006.01)
(Continued)

(52) U.S. Cl.
CPC ......... *F01N 3/2006* (2013.01); *F01N 3/0821* (2013.01); *F01N 3/208* (2013.01);
(Continued)

(58) Field of Classification Search
CPC .... F01N 3/2006; F01N 3/2066; F01N 3/0821; F01N 3/208; F01N 3/2053;
(Continued)

(56) References Cited

U.S. PATENT DOCUMENTS 2,488,563 A * 11/1949 Sills .......................... F01N 3/08
                                                    123/198 R
3,645,098 A *  2/1972 Templin ................. F01N 3/0814
                                                    123/568.11
(Continued)

FOREIGN PATENT DOCUMENTS

DE      2851675 A1 *  6/1980  .......... F01N 3/2053
DE      4311904    * 10/1994  .......... F01N 3/2006
(Continued)

OTHER PUBLICATIONS

European Search Report dated Jan. 24, 2013.
International Search Report dated Sep. 10, 2013.

*Primary Examiner* — Patrick Maines

(57) ABSTRACT

Directing exhaust gas around a catalyst may pre-heat the catalyst and may thereby bring the catalyst quickly in its operating temperature range. An exhaust gas treatment system for treating the exhaust gas may include a first flow path, a second flow path, and a control system. The first flow path may include a catalyst. The second flow path may be coaxially arranged in heat exchange relation with respect to the first flow path. The control system may be configured to control the flow of exhaust gas through the first flow path or the second flow path dependent upon the catalyst temperature.

16 Claims, 3 Drawing Sheets

(51) Int. Cl.
  *F02B 37/18* (2006.01)
  *F02B 37/00* (2006.01)
  *F01N 3/08* (2006.01)

(52) U.S. Cl.
  CPC ......... *F01N 3/2053* (2013.01); *F01N 3/2066* (2013.01); *F02B 37/004* (2013.01); *F02B 37/013* (2013.01); *F02B 37/18* (2013.01); F01N 2240/02 (2013.01); F01N 2410/03 (2013.01); F01N 2410/06 (2013.01); F01N 2590/02 (2013.01); F01N 2590/08 (2013.01); F01N 2900/1602 (2013.01); Y02T 10/144 (2013.01); Y02T 10/24 (2013.01); Y02T 10/26 (2013.01)

(58) Field of Classification Search
  CPC ......... F01N 2590/02; F01N 2900/1602; F01N 2410/03; F01N 2240/02; F01N 2590/08; F01N 2410/06; F02B 37/004; F02B 37/013; F02B 37/18; Y02T 10/144; Y02T 10/24; Y02T 10/26
  USPC .......................................................... 60/612
  See application file for complete search history.

(56) References Cited

U.S. PATENT DOCUMENTS

| | | | | |
|---|---|---|---|---|
| 4,444,012 A | * | 4/1984 | Gauffres | F01N 3/2053 60/276 |
| 4,656,831 A | * | 4/1987 | Budininkas | F01N 3/02 210/251 |
| 5,345,762 A | * | 9/1994 | Lutze | F01N 3/2006 422/177 |
| 5,419,124 A | * | 5/1995 | Adamczyk, Jr. | B01D 53/9481 60/274 |
| 5,761,902 A | * | 6/1998 | Usami | F01N 3/0814 137/625.44 |
| 6,883,311 B2 | | 4/2005 | Liu | |
| 2002/0132726 A1 | * | 9/2002 | Endo | B01D 53/02 502/67 |
| 2003/0049176 A1 | * | 3/2003 | Sato | F01N 3/0814 422/83 |
| 2003/0200022 A1 | * | 10/2003 | Streichsbier | F01N 9/002 701/108 |
| 2003/0233825 A1 | * | 12/2003 | Asanuma | F01N 3/20 60/278 |
| 2004/0065077 A1 | * | 4/2004 | Ueno | F01N 3/0814 60/288 |
| 2006/0059910 A1 | * | 3/2006 | Spaeder | F01N 3/101 60/612 |
| 2006/0242947 A1 | * | 11/2006 | Kay | B01D 53/9422 60/284 |
| 2008/0028746 A1 | * | 2/2008 | Matsubara | F01N 3/0807 60/279 |
| 2008/0120966 A1 | * | 5/2008 | Sugiyama | F01N 3/0253 60/287 |
| 2009/0205325 A1 | | 8/2009 | Kistner et al. | |
| 2011/0192143 A1 | | 8/2011 | Andersson et al. | |
| 2012/0227397 A1 | * | 9/2012 | Willi | F02B 41/10 60/605.1 |

FOREIGN PATENT DOCUMENTS

| | | |
|---|---|---|
| DE | 19960976 | 7/2001 |
| DE | 102005026032 | 12/2006 |
| DE | 102005043060 | 3/2007 |
| DE | 102007053931 | 5/2009 |
| EP | 2037091 | 3/2009 |
| EP | 2075050 | 7/2009 |
| WO | WO 2014/012617 | 1/2014 |

* cited by examiner

US 9,903,244 B2

COMPACT EXHAUST GAS TREATMENT SYSTEM AND METHOD OF OPERATING THE SAME

CLAIM FOR PRIORITY

This application is a U.S. National Phase entry under 35 U.S.C. § 371 from PCT International Application No. PCT/EP2013/001866, filed Jun. 25, 2013, which claims benefit of priority of European Patent Application No. 12176940.0, filed Jul. 18, 2012, all of which are incorporated herein by reference.

TECHNICAL FIELD

The present disclosure generally refers to a compact exhaust gas treatment system for treating exhaust gas from an internal combustion engine, and particularly to an exhaust gas system for heating a catalyst of the exhaust gas system. The present disclosure also relates to a method for controlling such an exhaust gas system.

BACKGROUND

Internal combustion engines exhaust a complex mixture of air pollutants. These air pollutants are composed of gaseous compounds such as nitrogen oxides ($NO_X$), and solid particulate matter also known as soot. Due to increased environmental awareness, exhaust emission standards have become more stringent, and the amount of $NO_X$ and soot emitted to the atmosphere by an engine may be regulated depending on the type of engine, size of engine, and/or class of engine.

In order to ensure compliance with the environmental regulations, for instance with the regulations of $NO_X$, exhaust gases may be treated by exhaust gas treatment devices. One strategy called selective catalytic reduction (SCR) for treating the exhaust gas may be implemented. SCR is a process where a gaseous or liquid reductant, for example, ammonia, ammonia water solution, urea or a urea solution, is injected into the exhaust gas stream of an engine. The reductant reacts with nitrogen oxides in the exhaust gas to form water and nitrogen. Usually, urea is introduced into the exhaust gases in an amount sufficient to provide the degree of $NO_X$ reduction desired. The desired amount of the reductant can be controlled by a urea injection system, for example.

Generally, SCR can be effective within a temperature range from about 200° C. to about 600° C. By providing a catalytic surface in the form of the SCR catalyst, the SCR process can be promoted and more efficiently performed, particularly at lower temperatures. Thus, it is important to provide a suitable temperature and a suitable catalytic material with a sufficiently large surface for the SCR reaction.

SCR as used herein generally includes those processes that utilize ammonia or any $NO_X$ reducing reagent capable of generating ammonia gas upon heating. The term "urea" as used herein is further meant to comprise all those reductants that are commercially available for performing SCR.

DE 10 2005 026 032 A1 discloses a method and device for treating exhaust gases. The device disclosed therein includes a particle separator, an SCR catalytic converter, and an ammonia generator for generating ammonia as a selective reducing agent for reducing nitrogen oxides. The particle separator is provided in a main exhaust line and the ammonia generator is provided in a secondary line.

U.S. Pat. No. 6,883,311 B2 discloses a compact dual leg $NO_X$ absorber catalyst device including a coaxial arranged dual leg apparatus comprising a housing having a first flow path and a second flow path having coaxially arranged portions. Furthermore, a device is disclosed for selectively directing the exhaust gases between the first flow path and the second flow path. Depending on a regeneration event of the $NO_X$ catalyst disposed within the first flow path, the device for selectively directing the exhaust gas may control the exhaust gas stream.

DE 10 2007 053 931 A1 discloses an exhaust gas treatment system and method for operating the same. The exhaust gas treatment systems includes a first flow path having a first catalyst and a second flow path having a second catalyst, wherein the first flow path is parallel arranged with respect to the second flow path and in a heat exchange relation.

The present disclosure is directed, at least in part, to improving or overcoming one or more aspects of prior systems.

SUMMARY OF THE DISCLOSURE

According to an aspect of the present disclosure, an exhaust gas treatment system for treating exhaust gas from an internal combustion engine may comprise a first flow path for the exhaust gas and a catalyst arranged within the first flow path. The catalyst may be configured to treat the exhaust gas at a catalyst temperature above a predetermined temperature threshold. The disclosed exhaust gas treatment system may further comprise a second flow path coaxially arranged in heat exchange relation with respect to the first flow path, and a control system. The control system may be configured to, when the temperature of the catalyst may be below the predetermined temperature threshold, direct the exhaust gas through the second flow path thereby heating the catalyst and, when the temperature of the catalyst may exceed the predetermined temperature threshold, direct the exhaust gas through the first flow path to treat the exhaust gas in the catalyst.

According to another aspect of the present disclosure, a method for controlling exhaust gas through an exhaust gas treatment system associated with an internal combustion engine is disclosed. The exhaust gas treatment system may comprise a first flow path for the exhaust gas, a catalyst arranged within the first flow path and being configured to treat the exhaust gas at a catalyst temperature above a predetermined temperature threshold, and a second flow path coaxially arranged in heat exchange relation with respect to the first flow path. The disclosed method may comprise detecting a temperature of the catalyst, directing the exhaust gas through the first flow path, when the detected temperature of the catalyst may exceed a predetermined temperature threshold, and directing the exhaust gas through the second flow path for heating the catalyst, when the temperature of the catalyst may be below the predetermined temperature threshold.

According to another aspect of the present disclosure, an internal combustion engine may comprise an engine block, a high-pressure turbocharger including a high-pressure turbine and being disposed upstream of the engine block, a low pressure turbocharger including a low-pressure turbine and being disposed downstream of the engine block, and an exhaust gas treatment system according to the present disclosure. The exhaust gas treatment system may be configured to connect the high-pressure turbine to the low pressure turbine.

In some embodiments, the first flow path may be inwardly arranged with respect to the second flow path.

Other features and aspects of this disclosure will be apparent from the following description and the accompanying drawings.

DETAILED DESCRIPTION

Figure 1:
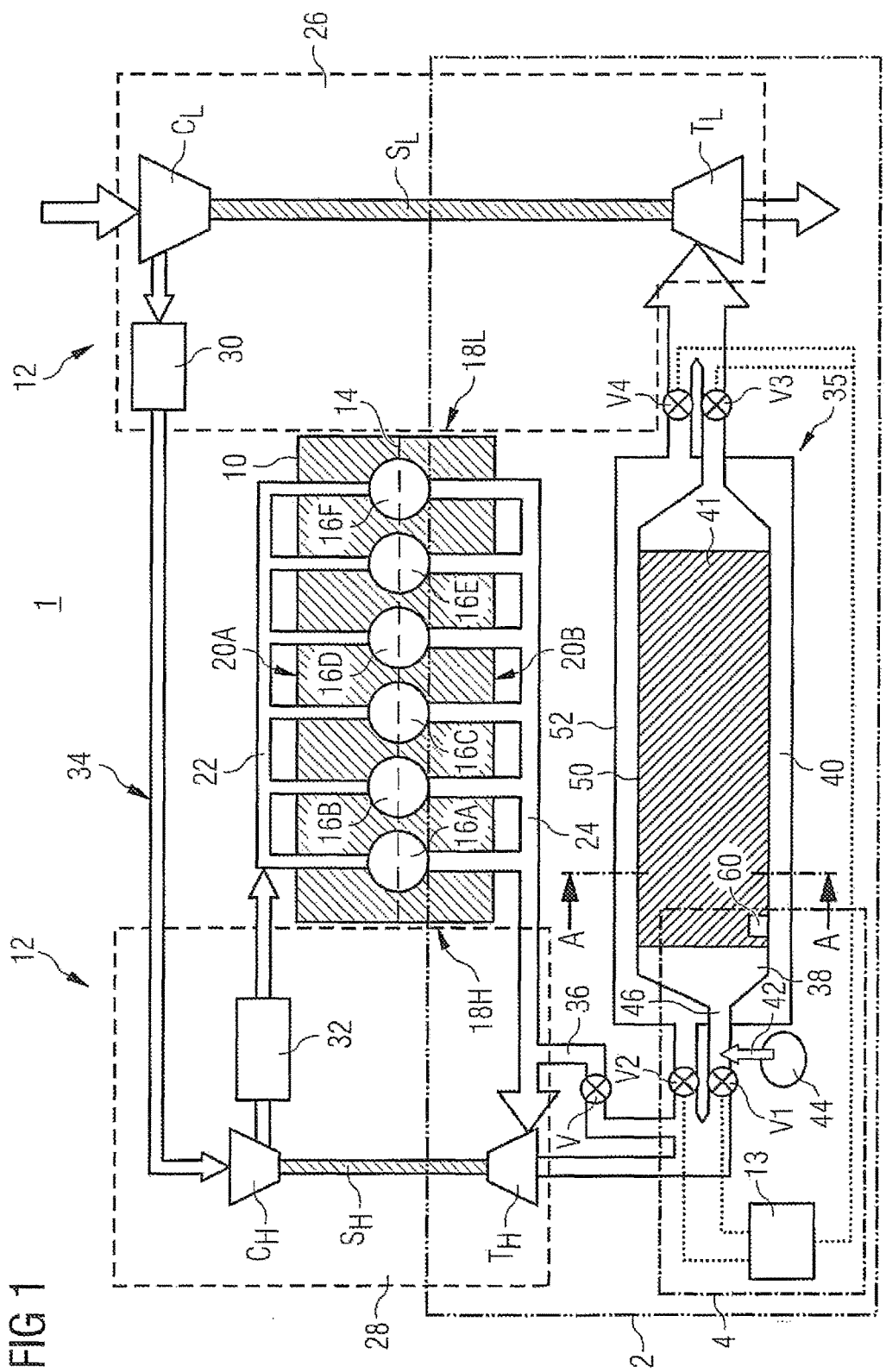
FIG. 1 is a schematic top view of an internal combustion engine with a two-stage turbocharged system.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure may be based in part on the realization that bypassing a catalyst through a bypass being in heat exchange relation with respect to a main exhaust gas flow path comprising a catalyst may heat the catalyst, such that the catalyst may early reach its operating temperature. Particularly, during the start of an internal combustion engine, this may lead to a shorter idle time of the catalyst and, thus, to less emission of untreated exhaust gas. Furthermore, a compact design of the bypass and the catalyst may be achieved. This compact design may further provide a higher vibration resistance.

The present disclosure may be further based in part on the realization that bypassing the catalyst and heating the same may further prevent the catalyst from being clogged by, for example, soot contained within the exhaust gas which may deposit at the catalyst.

Exemplary embodiments of a two-stage turbocharged internal combustion engine with an exhaust gas treatment system are described in the following with reference to FIGS. 1 to 3.

An internal combustion engine 1, such as an in-line 6-cylinder engine, may comprise an engine block 10, a two-stage turbocharged system 12, a fuel tank (not shown), and an exhaust gas system 2 which may be provided with at least one exhaust gas treatment device 41 and a control system 4 comprising an engine control unit 13. The engine block 10 may include a crankcase within which a crankshaft 14 may be supported. The crankshaft 14 is indicated by a dashed line in FIG. 1. The crankshaft 14 may be connected to pistons (not shown), which may be movable within respective cylinders 16A to 16F during operation of the internal combustion engine 1.

The engine block 10 as illustrated may have end sides 18L and 18H, being opposite in a lengthwise direction defined by the crankshaft 14. The engine block 10 may further have long sides 20A and 20B being opposite in a direction orthogonal to the lengthwise direction of the crankshaft 14.

An intake manifold 22 may extend along the long side 20A of the engine block 10 and may be fluidly connected to each of cylinders 16A to 16F. Each of the cylinders 16A to 16F may be provided with at least one inlet valve (not shown), which may be adapted to open or close the fluid connection between intake manifold 22 and a working chamber of the respective cylinder.

At the long side 20B, an exhaust manifold 24 may be provided, which may be connected to each of the cylinders 16A to 16F. Each of the cylinders 16A to 16F may be provided with at least one exhaust valve (not shown) configured to open and close the fluid connection between the working chambers of the respective cylinders 16A to 16F and the exhaust manifold 24.

Generally, when the internal combustion engine 1 is operated, charge air may be introduced into the cylinders 16A to 16F through the intake manifold 22. After combustion, exhaust gases generated by the combustion process may be released from the cylinders 16A to 16F through the exhaust gas manifold 24.

The two-stage turbocharged system 12 may comprise a low-pressure stage turbocharger 26 and a high-pressure stage turbocharger 28, the turbochargers 26 and 28 forming a sequential turbocharger system.

Generally, the turbochargers 26, 28 may be applied to use the heat and pressure of the exhaust gas of the internal combustion engine 1 to drive compressors $C_L$, $C_H$ for compressing the charge air for the internal combustion engine 1. Specifically, the exhaust gas passing the turbines $T_L$, $T_H$ of the turbochargers 26, 28 may rotate the turbines $T_L$, $T_H$, thereby decreasing in pressure and temperature. The compressors $C_L$, $C_H$ of the turbochargers 26, 28 are rotatably connected via common shafts $S_L$, $S_H$ with the turbines $T_L$, $T_H$ and may be driven by the turbines $T_L$, $T_H$.

At end side 18L (also referred to as low-pressure side) the low-pressure stage turbocharger 26 may be fixedly attached to the engine block 10, for example, directly or as a unit in combination with other components such as coolant blocks etc. The low-pressure stage turbocharger 26 may comprise the compressor $C_L$ and the turbine $T_L$ that are mechanically connected via the common shaft $S_L$.

At side 18H (also referred to as high-pressure side) the high-pressure stage turbocharger 28 may be fixedly attached to the engine block 10, for example, directly or as a unit in combination with other components such as coolant blocks etc. The high-pressure stage turbocharger 28 may comprise the compressor $C_H$ and the turbine $T_H$ that are connected via the common shaft $S_H$.

An inlet of the compressor $C_L$ may be configured to suck in charge air for the combustion process. Generally, an outlet of the compressor $C_L$ may be fluidly connected via compressor connection 34 with an inlet of the compressor $C_H$. For example, the outlet of the compressor $C_L$ may be connected via a first cooler 30 to an inlet of the compressor $C_H$. Then, an outlet of the compressor $C_H$ may be connected via a second cooler 32 with the intake manifold 22 being configured to distribute the charge air to the cylinders 16A to 16F.

The low-pressure stage turbocharger 26 and the first cooler 30 may form a first unit that as such may be mounted to the end side 18L of the engine block 10. The high-pressure stage turbocharger 28 and the second cooler 32 may form a second unit that as such may be mounted to the end side 18H of the engine block 10.

Usually, access to engine components, such as the cylinders 16A to 16F and the manifolds 22, 24, may be provided from the long sides 20A, 20B while the side faces of the engine block 10 at the end sides 18L and 18H may be configured and shaped for mounting large components of the two-stage turbocharged system 12, such as the turbochargers 26, 28 or the cooler/turbocharger units.

Thus, the charge air provided for the combustion process may be compressed prior to introduction into the engine cylinders using the two-stage turbocharged system 12.

During operation of the internal combustion engine 1, the charge air is accordingly twice compressed and cooled before charging of the cylinders 16A to 16F. Within the cylinders 16A to 16F, further compression and, therefore, heating of the charge air may be caused through the movement of the pistons. Then, an appropriate amount of fuel, for instance diesel oil, marine diesel oil, heavy fuel oil or a mixture thereof may be injected into the cylinders 16A to 16F. Therein, the fuel may be combusted with the compressed charged air and produce exhaust gases, which may be discharged via the exhaust manifold 24.

For medium speed large internal combustion engines, the compressor $C_L$ may compress the charge air to, for example, 4 to 5 bar at 180° C. The cooler 30 may cool the charge air from, for instance, about 180° C. to 45° C. The compressor $C_H$ may compress the charge air to, for instance, 7 to 8 bar at 180° C. and the cooler 32 may cool the charge air from, for example, about 180° C. to 45° C. After combustion, the exhaust gas may have a pressure of about 5 to 6 bar at a temperature in the range of, for instance, about 450° C. to 600° C. Within a turbine connection 35, the pressure drops to 3 to 4 bar and a temperature in the range of about 350° C. to 450° C. After turbine $T_L$ the temperature at ambient pressure may be in the range of or below, for example, 250° C.

An outlet of the exhaust manifold 24 may be fluidly connected to an inlet of the turbine $T_H$. An outlet of the turbine $T_H$ may be fluidly connected with an inlet of the turbine $T_L$ via the turbine connection 35 and an outlet of the turbine $T_L$ may release the exhaust gas, for example, into a secondary exhaust filtering system or directly into the environment.

The turbine $T_H$ of the high-pressure turbocharger 28 may be disposed downstream of the exhaust manifold 24. An outlet of the turbine $T_H$ may be fluidly connected with an inlet of the turbine $T_L$, which may be disposed downstream of the turbine $T_H$. Furthermore, the turbine $T_H$ and the turbine $T_L$ may be fluidly connected via the turbine connection 35. The turbine $T_L$ having an outlet may release the exhaust gas, for example, into a secondary exhaust filtering system or directly into the environment.

The above described cycle may be repeated continuously as long as the internal combustion engine 1 continues to run.

During operation of the internal combustion engine 1, the compressors $C_L$ and $C_H$ may be driven by the turbines $T_L$ and $T_H$ in a controlled manner as the amount of exhaust gas provided to the turbine $T_H$ may be controlled, for example, via a valve V provided in a valve connection 36 fluidly connecting the exhaust manifold 24 and the turbine connection 35. In this case, the exhaust system 2 may also be in an operation mode.

The turbine connection 35 extends along the long side 20B. Thus, in the case of a medium speed large internal combustion engine, the turbine connection 35 may have a length of several meters, for example, 5 m. The turbine connection 35 may be a tubular conduit having a diameter of several tenths of meters, for example. Generally, the turbine connections may have a diameter of about 0.5 to 1 times the inner diameter of a piston of the turbocharged internal combustion engine. For internal combustion engines having piston diameters of about 0.2 to 0.6 m, a diameter of the turbine connection may be in the range of about 0.1 m to 0.6 m, and possibly about 0.3 m, 0.4 m, or 0.5 m or larger, for example. For medium speed internal combustion engines, the diameters of the turbine connections may be, for example, in the range of about 0.3 m to 0.5 m.

The turbine connection 35 may include a first flow path 38 and a second flow path 40 being arranged in a heat exchange relation with respect to the first flow path 38. In some embodiments, the first flow path 38 may be arranged adjacent the second flow path 40.

Figure 2:
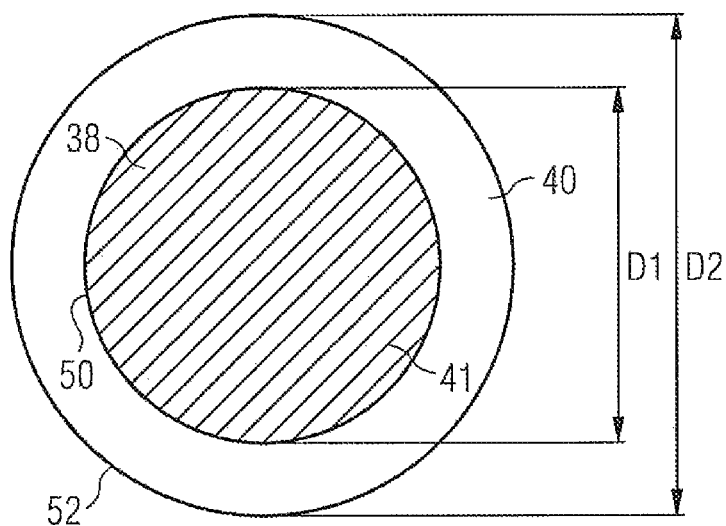
FIG. 2 is a cross-sectional view along a line A-A in FIG. 1.

As shown in FIGS. 1 and 2, the first flow path 38 may be coaxially arranged with the second flow path 40. For example, the first flow path 38 may be inwardly arranged with respect to the second flow path 40. In some embodiments, the first flow path 38 may be outwardly arranged with respect to the second flow path 40.

The first flow path 38 may be defined by an inner wall 50. The second flow path 40 may be defined by the inner wall 50 and an outer wall 52, which may surround the inner wall 50. The inner wall 50 and the outer wall 52 may comprise a substantially tubular shape having a circular cross-section, as illustrated in FIG. 2 in greater detail.

In some embodiments, the first and second flow paths 38 and 40 may comprise a rectangular cross-section, a triangular cross-section, an elliptical cross-section, or any other suitable cross-section for arranging the first and second flow paths 38 and 40 coaxially to each other. It should be further noted that the first flow path 38 may also comprise a cross-section different to the cross-section of the second flow path 40. For instance, the first flow path 38 may comprise a triangular cross-section, whereas the second flow path 40 coaxially arranged with respect to the first flow path 38 may comprise a circular cross-section.

The first flow path 38 may comprise a first diameter D1. The second flow path 40 may comprise a second diameter D2 being substantially greater than the first diameter D1.

The inner wall 50 may be configured to transmit heat from the first flow path 38 to the second flow path 40, or vice versa. For example, the inner wall 50 may be a thermoconductive wall, such that the first flow path 38 may be in a heat exchange relation with respect to the second flow path 40.

The first flow path 38 may include an exhaust gas treatment device, such as a catalyst 41. For example, the catalyst 41 may comprise a selective catalytic reduction (SCR) catalyst, an oxidation catalyst or a DPF. Upstream of the catalyst 41, an reagent injection inlet 42 for injecting a chemical reagent, for example, urea as a reductant for SCR, into the first flow path 38 may be provided. The injection inlet 42 may be part of a reagent injection system 44. The reagent injection device may be configured to, when the temperature of the catalyst 41 may exceed the predetermined temperature threshold, inject a predetermined amount of the reagent upstream of the catalyst 41. In the case of a DPF, a burner for an active regeneration of the DPF may be provided. Between the injection inlet 42 and the catalyst 41, the first flow path 38 may include a reagent homogenization section 46. The reagent homogenization section 46 may have a length sufficiently long to provide a homogeneous distribution of the reagent in the exhaust gas before reaching the catalyst 41.

The length of the homogenization section 46 can be, for example, about four times or more the inner diameter of the homogenization section 46. For instance, the inner diameter of the homogenization section 46 may be about 0.25 m and, therefore, the length of the homogenization section may be, for instance, 1 m or more. In some embodiments, the length of homogenization section 46 may be about two or more times the inner diameter of the homogenization section 46.

In some configurations, additional homogenization may be achieved by structural design or additional components (for example turbines or baffles) such that a shorter length of the homogenization section 46 may be applied.

By providing the turbine connection 35 between the stages of the two-stage turbocharged system, components of the exhaust gas, for instance $NO_X$, may perform the catalytic reaction at pressures in a range from 2 to 5 bar. For example, medium speed engines may be operated with exhaust gas having a pressure in a range of, for example, about 3 to 4 bar and in a temperature range of about 300° C. to 500° C., and possibly within a temperature range of about 350° C. to 450° C. As the required catalytic surface may be proportional to the volume of the catalyst, the dimensions of the catalyst may be smaller at increased pressure than for a catalyst provided at ambient pressure, for example after turbine $T_L$ (i.e. at about 1 bar and 250° C.).

The exhaust gas treatment system 2 may be controlled by the control system 4. The control system 4 may comprise a control unit 13, a temperature sensor 60, and a valve unit.

The valve unit may be configured to, when the detected temperature of the catalyst 41 may exceed the predetermined temperature threshold, allow the exhaust gas to flow through the first flow path 38, and to restrict the exhaust gas to flow through the second flow path 40. The valve unit may be further configured to, when the detected temperature of the catalyst 41 may be below the predetermined temperature threshold, restrict the exhaust gas to flow through the first flow path 38, and to allow the exhaust gas to flow through the second flow path 40.

A further valve unit disposed downstream the catalyst 41 may be configured to, when the detected temperature of the catalyst (41) may exceed the predetermined temperature threshold, restrict the exhaust gas to flow into the second flow path 40 after flowing through the first flow path 38, The further valve unit may be further configured to, when the detected temperature of the catalyst 41 may be below the predetermined temperature threshold, restrict the exhaust gas to flow into the first flow path 38 after flowing through the second flow path 40.

The valve unit may comprise a first valve V1 arranged within the first flow path 38 upstream of the catalyst 41. The first valve V1 may be configured to open or close the first flow path 38, thereby enabling or restricting the exhaust gas from passing the first valve V1.

The valve unit may further comprise a second valve V2 arranged within the second flow path 40 and configured to open or close the second flow path 40, thereby enabling or restricting the exhaust gas from passing the second valve V2.

The first valve V1 and the second valve V2 may be in communication with the control unit 13 being configured to control operation of the first and second valves V1 and V2.

In some embodiments, instead of the first and second valves V1 and V2, the valve unit may comprise a three way valve, for example a 3/2 way valve, arranged upstream of the catalyst 41. In such embodiment, the three way valve may be configured to direct the exhaust gas either through the first flow path 38 or the second flow path 40. The operation of the three way valve may be also controlled by the control unit 13. The control unit 13 may be configured to, when the temperature of the catalyst 41 may exceed the predetermined threshold, control the three way valve to direct the exhaust gas through the first flow path 38, and, when the temperature of the catalyst 41 may be below the predetermined threshold, control the three way valve to direct the exhaust gas through the second flow path 40.

In some embodiments, the valve unit may optionally comprise a third valve V3 disposed within the first flow path 38 and downstream the catalyst 41. Furthermore, the valve unit may optionally comprise a fourth valve V4 disposed within the second flow path 40 and downstream the catalyst 41. The valves V3 and V4 may be configured to restrict the exhaust gas from entering the first or second flow paths 38, 40 from a side downstream of the catalyst 41.

In some embodiments, instead of the third and fourth valves V3 and V4, the valve unit may comprise a three way valve, for example a 3/2 way valve, arranged downstream of the catalyst 41. The operation of the three way valve may be also controlled by the control unit 13.

The first flow path 38 may further comprise the temperature sensor 60 configured to detect a temperature of the catalyst 41. The temperature sensor may be further configured to transmit a temperature signal indicative of the catalyst temperature to the control unit 13. The control unit 13 may use the received temperature signal for controlling and directing the exhaust gas stream flowing through the exhaust gas treatment system 2 and, thus, through the turbine connection 35.

The control unit 13 may compare the temperature signal indicating the catalyst temperature with a predetermined temperature threshold. In the case that the catalyst temperature may be below the predetermined temperature threshold, the control unit 13 may direct the exhaust gas through the second flow path 40, i.e. the exhaust gas may not be treated by the catalyst 41. Thereby, the exhaust gas flowing through the second flow path 40 may heat the catalyst 41, as the second flow path may be in heat exchange relation with the first flow path and, therefore, with the catalyst 41. For example, during an engine start, the catalyst temperature may be below the predetermined temperature threshold. Therefore, the exhaust gas may be directed through the second flow path 40 for pre-heating the catalyst 41, thereby bringing the catalyst 41 temperature into its operating temperature range.

In the case that the catalyst temperature may exceed the predetermined temperature threshold, the control unit 13 may direct the exhaust gas through the first flow path 38, i.e. the catalyst 41 may treat the exhaust gas.

For example, the predetermined temperature threshold may be a temperature from about 250° C. up to 550° C., dependent on the power output of the internal combustion engine 1.

Figure 3:
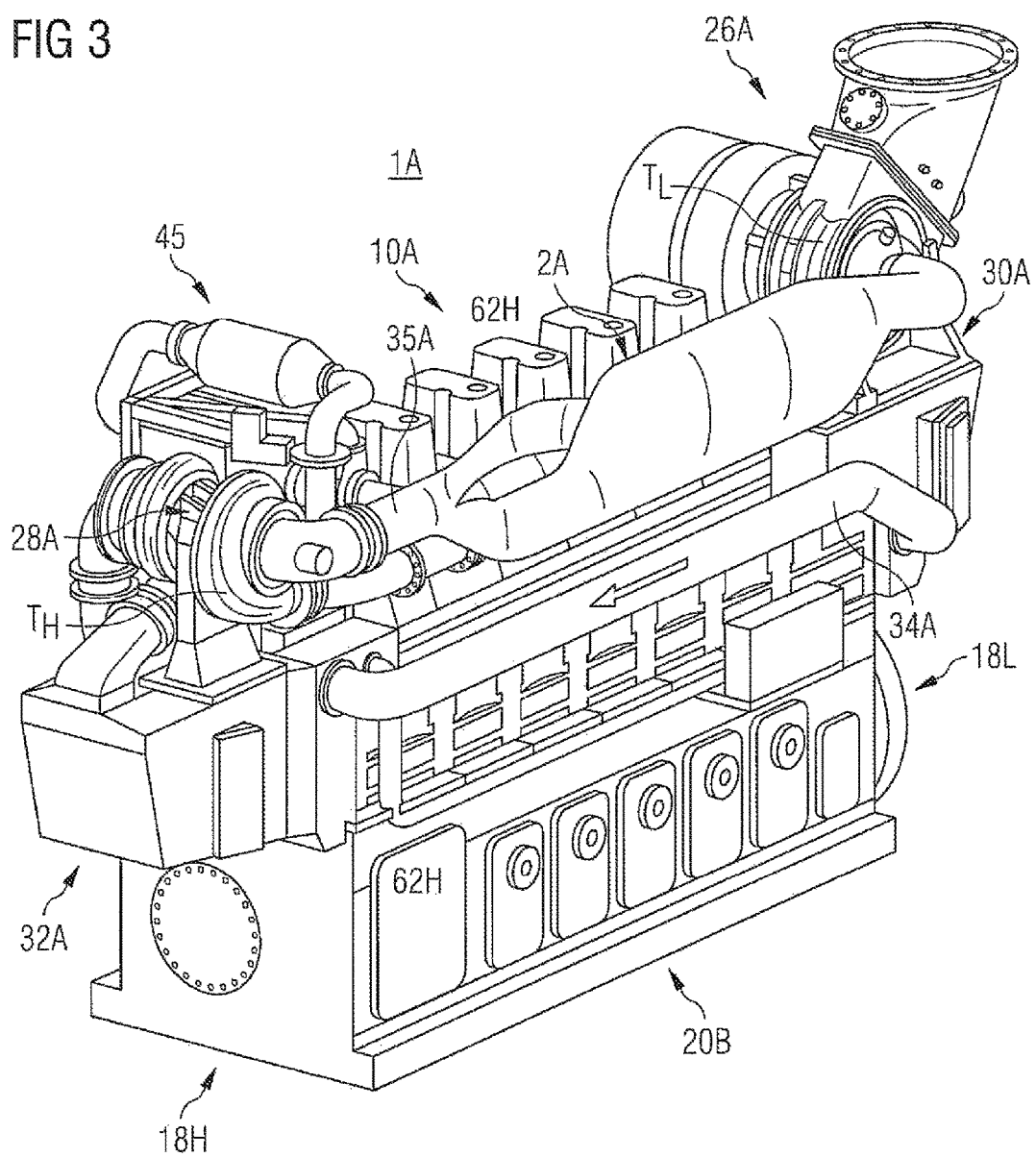
FIG. 3 is a schematic perspective view of an internal combustion engine with a two-stage turbocharged system.

For further illustration, FIG. 3 shows an engine 1A that comprises a low-pressure turbocharger 26A and a high-pressure turbocharger 28A that each form structural units together with coolers 30A and 32A, respectively. The units may be fixedly connected to an engine block 10A at end sides 18L and 18H.

Along long side 20B, an exhaust manifold 24 (shown in FIG. 1) may be fluidly connected to each of the cylinders (shown between turbochargers 26A and 28A) and an inlet manifold (not shown in FIG. 3) may similarly be fluidly connected to the cylinders.

A compressor connection section 34A may extend between the end sides 18L and 18H of the engine block 10A along the long side 20B of the engine block 10A. Specifically, the compressor connection section 34A may extend from the outlet of the first cooler 30A to the inlet of the compressor $C_H$ of high-pressure turbocharger 28A. The compressor connection section 34A may be a tubular conduit used, for example, to add an additive (e.g. water) to the pre-compressed charge air.

A turbine connection 35A may extend between the end sides 18L and 18H of the engine block 10A along the long side 20B of the engine block 10A. Specifically, the turbine connection 35A may extend from the outlet of the turbine $T_H$ of the high-pressure turbocharger 28A to the inlet of the turbine $T_L$ of the low-pressure turbocharger 26A. The turbine connection 35A may comprise a linear tubular segment that may be used as an exhaust gas treatment system 2A with at least one exhaust gas treatment device, for instance, a SCR catalyst, an oxidation catalyst, or the like, schematically indicated in FIG. 3.

In FIG. 3, the exhaust gas treatment device may be at least one SCR catalyst or at least one oxidation catalyst. In some embodiments, an SCR catalyst and an oxidation catalyst may be provided.

In FIG. 3, an exhaust gas recycling (EGR) system 45 is shown. The EGR system 45 may be used to reduce the $NO_X$ generated during the combustion and may in some cases be used together or alternatively to the SCR catalyst during operation. For example, during the start up of an engine, the EGR 45 may be used and, for a warmed up engine, the SCR catalyst may be used.

In some embodiments, the EGR system 45 shown in FIG. 3 may not be provided.

In yet another embodiment, the internal combustion engine 1 may be provided with a single-stage turbocharger system. In this embodiment, the charge air provided for the combustion process may be pressurized once prior to introduction into the engine cylinders using the single-stage turbocharged system.

In some embodiments, the intake manifold and exhaust manifold 24B may be integrally cast with, for example, the crank case of the engine block 10A.

In some embodiments, the above disclosed two-stage turbocharged systems may be applied to a V-engine including, for example, two cylinder banks, each corresponding to the single cylinder banks of FIGS. 1 and 3, one of which being mirrored with respect to a vertical central plane of the engine block including its crankshaft. In those embodiments, an intake manifold may be located, for example, between the cylinder banks and each of the cylinder banks may be provided with a separate exhaust manifold.

INDUSTRIAL APPLICABILITY

In the following, operation of an exhaust gas system 2, such as that shown in FIG. 1 is described with reference to FIGS. 1 to 3.

When the internal combustion engine 1 may get started, the catalyst temperature may be below the predetermined temperature threshold and, therefore, not within its operating temperature range. In this case, the control system 4 may direct the exhaust gas through the second flow path 40 without treating the same by the catalyst 41. Particularly, the control unit 13 may close the first valve V1 and may open the second valve V2.

As the second flow path 40 may be in a heat exchange relation with respect to the first flow path 38 and, thus, also in a heat exchange relation with the catalyst 41 disposed within the first flow path 38, the exhaust gas flowing through the second flow path 40 may heat the catalyst 41.

When the temperature sensor 60 may detect that the catalyst temperature may exceed the predetermined threshold, the temperature sensor 60 may send a temperature signal indicative of the catalyst temperature to the control unit 13.

In this case, the control system 4 may direct the exhaust gas through the first flow path 38 and, thus, through the catalyst 41, thereby treating the exhaust gas. Particularly, the control unit 13 may open the first valve V1 and may close the second valve V2.

By pre-heating the catalyst 41 with the exhaust gas bypassing the same, the catalyst 41 may reach its operating temperature range earlier. Thus, the amount of exhaust gas, which may not be treated until the catalyst 41 reaches its operating temperature range, may be reduced. This may lead to less emissions of untreated exhaust gas.

Furthermore, clogging of the catalyst 41 may be reduced as the catalyst 41 may be heated by bypassing the same and not by flowing therethrough. Therefore, soot contained within the exhaust gas may not deposit at the catalyst 41.

After flowing through the turbine connection 35, the first flow path 38 and the second flow path 40 may reunite and, then, the exhaust gas may enter the turbine $T_L$ of the low-pressure turbocharger 26.

For restricting the exhaust gas from entering the first or second flow paths 38 or 40 after reuniting, the control unit 13 may open or close, respectively, the valves V3 and V4. For example, when the catalyst temperature may be below the predetermined temperature threshold, the control unit 13 may open the second valve V2 and the fourth valve V4, and may simultaneously close the first valve V1 and the third valve V3, thereby directing the exhaust gas through the second flow path 40 and heating the catalyst 41 within the first flow path 38.

Furthermore, when the catalyst temperature may exceed the predetermined temperature threshold, the control unit 13 may open the first valve V1 and the third valve V3, and may simultaneously close the second valve V2 and the fourth valve V4, thereby directing the exhaust gas through the first flow path 40 and, therefore, treating the exhaust gas by the catalyst 41.

As used herein, opening and closing of any one of the valves V1, V2, V3, and V4 may relate to a total opening and closing of the respective valve. However, closing of one of the above-mentioned valves may also include that the majority of the exhaust gas may not pass therethrough, but a small amount of about 0 to 5% may still pass the closed valve. In some embodiments, the highest amount which is allowed to pass the closed valve may depend on the catalyst efficiency and on the emission goal which may be reached.

In some embodiments, the control system 4 may direct the exhaust gas through the second flow path 40 when no after-treatment of the exhaust gas may be required, for example, when a ship comprising an exemplary disclosed internal combustion engine 1 including an exemplary disclosed exhaust gas treatment system 2 may be out of emission control areas.

In some embodiments, the exhaust gas treatment device, e.g. an SCR catalyst, may be constituted by more than one exhaust gas treatment device being arranged in a known manner, e.g. in a parallel or serial manner.

Herein, the term "internal combustion engine" may refer to internal combustion engines which may be used as main or auxiliary engines of stationary power providing systems such as power plants for production of heat and/or electricity as well as in ships/vessels such as cruiser liners, cargo ships, container ships, and tankers. Fuels for internal combustion engines may include diesel oil, marine diesel oil, heavy fuel oil, alternative fuels or a mixture thereof, and natural gas.

In addition, the term "internal combustion engine" as used herein is not specifically restricted and comprises any engine, in which the combustion of a fuel occurs with an oxidizer to produce high temperature and pressure gases, which are directly applied to a movable component of the engine, such as pistons or turbine blades, and move it over a distance thereby generating mechanical energy. Thus, as used herein, the term "internal combustion engine" comprises piston engines and turbines.

Examples of internal combustion engines for the herein disclosed configuration of a two-stage turbocharged system include medium speed internal combustion diesel engines, like inline and V-type engines of the series M20, M25, M32, M43, or the M46 dual fuel engine manufactured by Caterpillar Motoren GmbH & Co. KG, Kiel, Germany.

Medium speed internal combustion engines may be large standalone engines that therefore provide reasonable access to the end sides of the engine block.

Although the preferred embodiments of this invention have been described herein, improvements and modifications may be incorporated without departing from the scope of the following claims.

The invention claimed is:

1. An exhaust gas treatment system for treating exhaust gas from an internal combustion engine, the exhaust gas treatment system comprising:
   a first flow path for the exhaust gas;
   a catalyst arranged within the first flow path, the catalyst being configured to treat the exhaust gas at a catalyst temperature above a predetermined temperature threshold;
   a second flow path coaxially arranged in heat exchange relation with respect to the first flow path, the second flow path not containing a catalyst;
   a reagent injection device arranged upstream of the catalyst, the reagent injection device being configured to, when the temperature of the catalyst exceeds the predetermined temperature threshold, inject a predetermined amount of a reagent upstream of the catalyst; and
   a control system being configured to, when the temperature of the catalyst is below the predetermined temperature threshold, direct the exhaust gas through the second flow path wherein the exhaust gas is not treated by a catalyst, thereby heating the catalyst in the first flow path and, when the temperature of the catalyst exceeds the predetermined temperature threshold, direct the exhaust gas through the first flow path to treat the exhaust gas in the catalyst.

2. The exhaust gas treatment system of claim 1, wherein the first flow path is inwardly arranged with respect to the second flow path.

3. The exhaust gas treatment system of claim 2, wherein the catalyst is at least one of an SCR catalyst, an oxidation catalyst, and a diesel particulate filter.

4. The exhaust gas treatment system of claim 2, further comprising:
   a valve unit disposed upstream of the catalyst and being in communication with a control unit, wherein the control unit is configured to, when the temperature of the catalyst exceeds the predetermined threshold, control the valve unit to direct the exhaust gas through the first flow path, and, when the temperature of the catalyst is below the predetermined threshold, control the valve unit to direct the exhaust gas through the second flow path.

5. The exhaust gas treatment system of claim 1, wherein the first flow path is outwardly arranged with respect to the second flow path.

6. The exhaust gas treatment system of claim 5, wherein the catalyst is at least one of an SCR catalyst, an oxidation catalyst, and a diesel particulate filter.

7. The exhaust gas treatment system of claim 5, further comprising:
   a valve unit disposed upstream of the catalyst and being in communication with a control unit, wherein the control unit is configured to, when the temperature of the catalyst exceeds the predetermined threshold, control the valve unit to direct the exhaust gas through the first flow path, and, when the temperature of the catalyst is below the predetermined threshold, control the valve unit to direct the exhaust gas through the second flow path.

8. The exhaust gas treatment system of claim 7, wherein the valve unit may comprise one or more of a first valve (V1) disposed within the first flow path, a second valve (V2) disposed within the second flow path, and a three-way valve.

9. The exhaust gas treatment system of claim 1, wherein the catalyst is at least one of an SCR catalyst, an oxidation catalyst, and a diesel particulate filter.

10. The exhaust gas treatment system of claim 1, further comprising:
    a valve unit disposed upstream of the catalyst and being in communication with a control unit, wherein the control unit is configured to, when the temperature of the catalyst exceeds the predetermined threshold, control the valve unit to direct the exhaust gas through the first flow path, and, when the temperature of the catalyst is below the predetermined threshold, control the valve unit to direct the exhaust gas through the second flow path.

11. The exhaust gas treatment system of claim 10, wherein the valve unit may comprise one or more of a first valve (V1) disposed within the first flow path, a second valve (V2) disposed within the second flow path, and a three-way valve.

12. The exhaust gas treatment system of claim 1, further comprising a temperature sensor being configured to detect the temperature of the catalyst.

13. An internal combustion engine comprising:
    an engine block;
    a high-pressure turbocharger including a high-pressure turbine ($T_H$) disposed downstream of the engine block;
    a low pressure turbocharger including a low-pressure turbine ($T_L$) disposed downstream of the high-pressure turbine ($T_H$); and
    an exhaust gas treatment system configured to fluidly connect the high-pressure turbine ($T_H$) to the low pressure turbine ($T_L$), the exhaust gas treatment system comprising:
    a first flow path for the exhaust gas;
    a catalyst arranged within the first flow path, the catalyst being configured to treat the exhaust gas at a catalyst temperature above a predetermined temperature threshold;
    a second flow path coaxially arranged in heat exchange relation with respect to the first flow path, the second flow path not containing a catalyst;
    a reagent injection device arranged upstream of the catalyst, the reagent injection device being configured to, when the temperature of the catalyst exceeds the predetermined temperature threshold, inject a predetermined amount of a reagent upstream of the catalyst; and
    a control system being configured to, when the temperature of the catalyst is below the predetermined temperature threshold, direct the exhaust gas through the second flow path wherein the exhaust gas is not treated by a catalyst, thereby heating the catalyst in the first flow path and, when the temperature of the catalyst exceeds the predetermined temperature threshold, direct the exhaust gas through the first flow path to treat the exhaust gas in the catalyst.

14. A method for controlling exhaust gas through an exhaust gas treatment system associated with an internal combustion engine, the exhaust gas treatment system comprising a first flow path for the exhaust gas, a catalyst arranged within the first flow path and being configured to treat the exhaust gas at a catalyst temperature above a predetermined temperature threshold, and a second flow path coaxially arranged in heat exchange relation with respect to the first flow path, the second flow path not containing a catalyst, the method comprising:

detecting a temperature of the catalyst;

directing the exhaust gas through the first flow path, when the detected temperature of the catalyst exceeds the predetermined temperature threshold;

directing the exhaust gas through the second flow path for heating the catalyst, wherein the exhaust gas is not treated by a catalyst, when the detected temperature of the catalyst is below the predetermined temperature threshold; and injecting a predetermined amount of a reagent into the first flow path upstream of the catalyst, when the detected temperature of the catalyst exceeds the predetermined temperature threshold.

15. The method of claim 14, further comprising:

when the detected temperature of the catalyst exceeds the predetermined temperature threshold, allowing the exhaust gas to flow through the first flow path and restricting the exhaust gas to flow through the second flow path; and when the detected temperature of the catalyst is below the predetermined temperature threshold, restricting the exhaust gas to flow through the first flow path and allowing the exhaust gas to flow through the second flow path.

16. The method claim 15, further comprising:

when the detected temperature of the catalyst exceeds the predetermined temperature threshold, restrict the exhaust gas to flow into the second flow path after flowing through the first flow path; and when the detected temperature of the catalyst is below the predetermined temperature threshold, restrict the exhaust gas to flow into the first flow path after flowing through the second flow path.

* * * * *